Jan. 20, 1970   W. J. ADAMS, JR   3,490,541
APPARATUS FOR PREPARING SOIL
Filed July 1, 1966   4 Sheets-Sheet 1
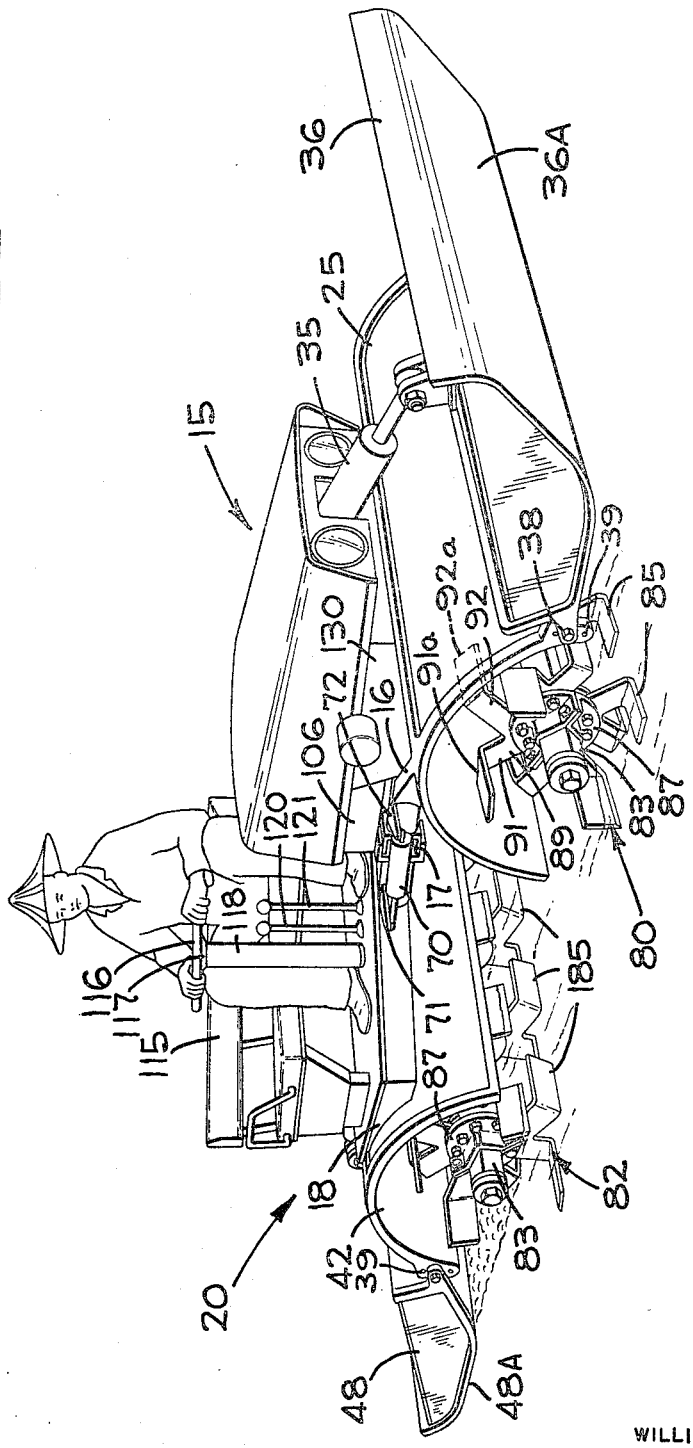
INVENTOR
WILLIAM J. ADAMS, JR.
BY Francis W. Anderson
ATTORNEY

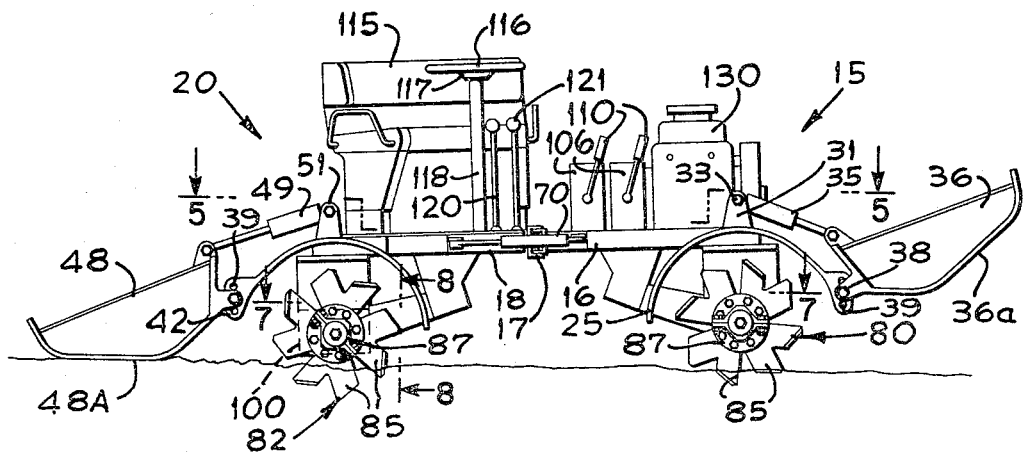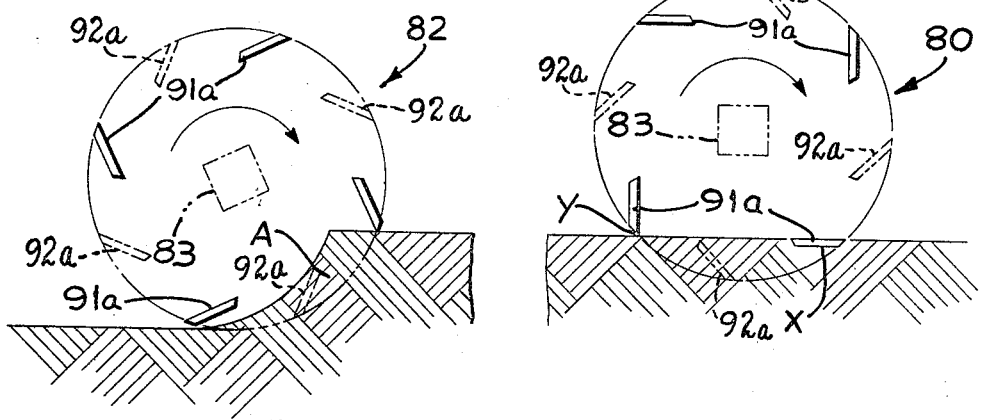

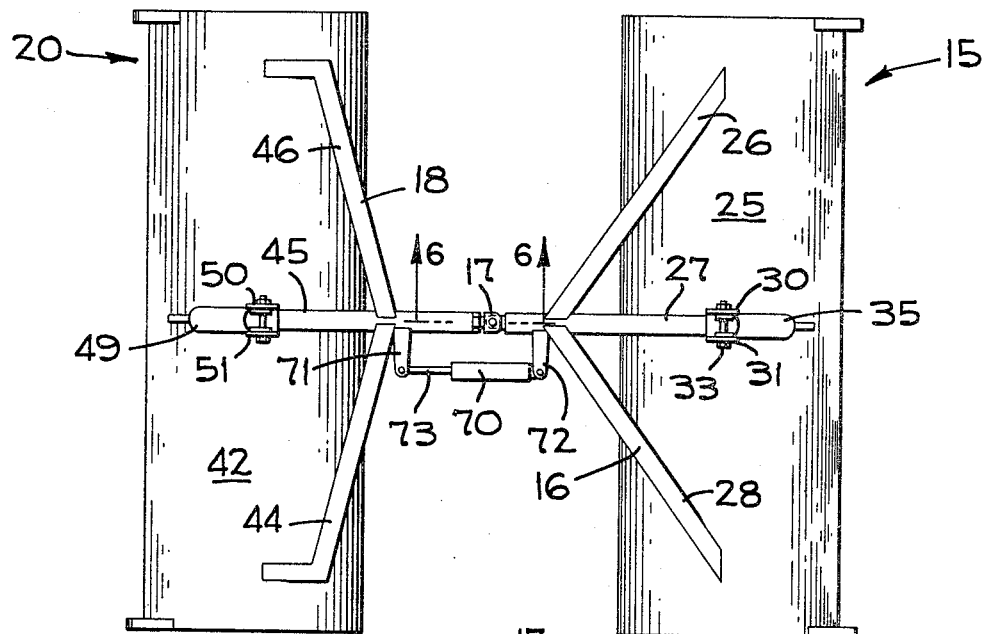
FIG_5
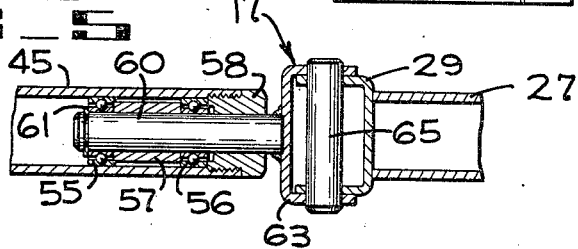
FIG_6
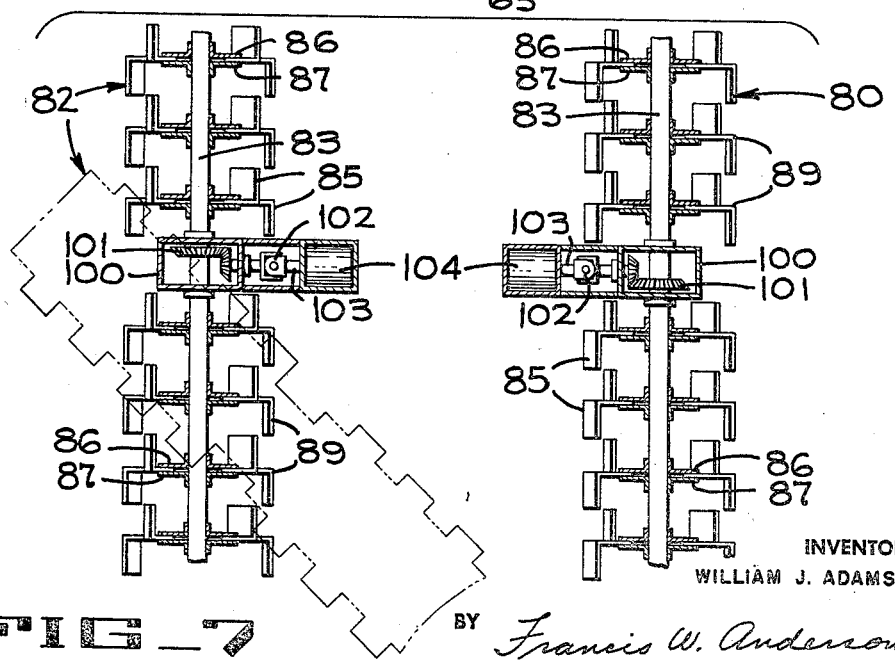
FIG_7
INVENTOR
WILLIAM J. ADAMS, JR.
BY Francis W. Anderson
ATTORNEY

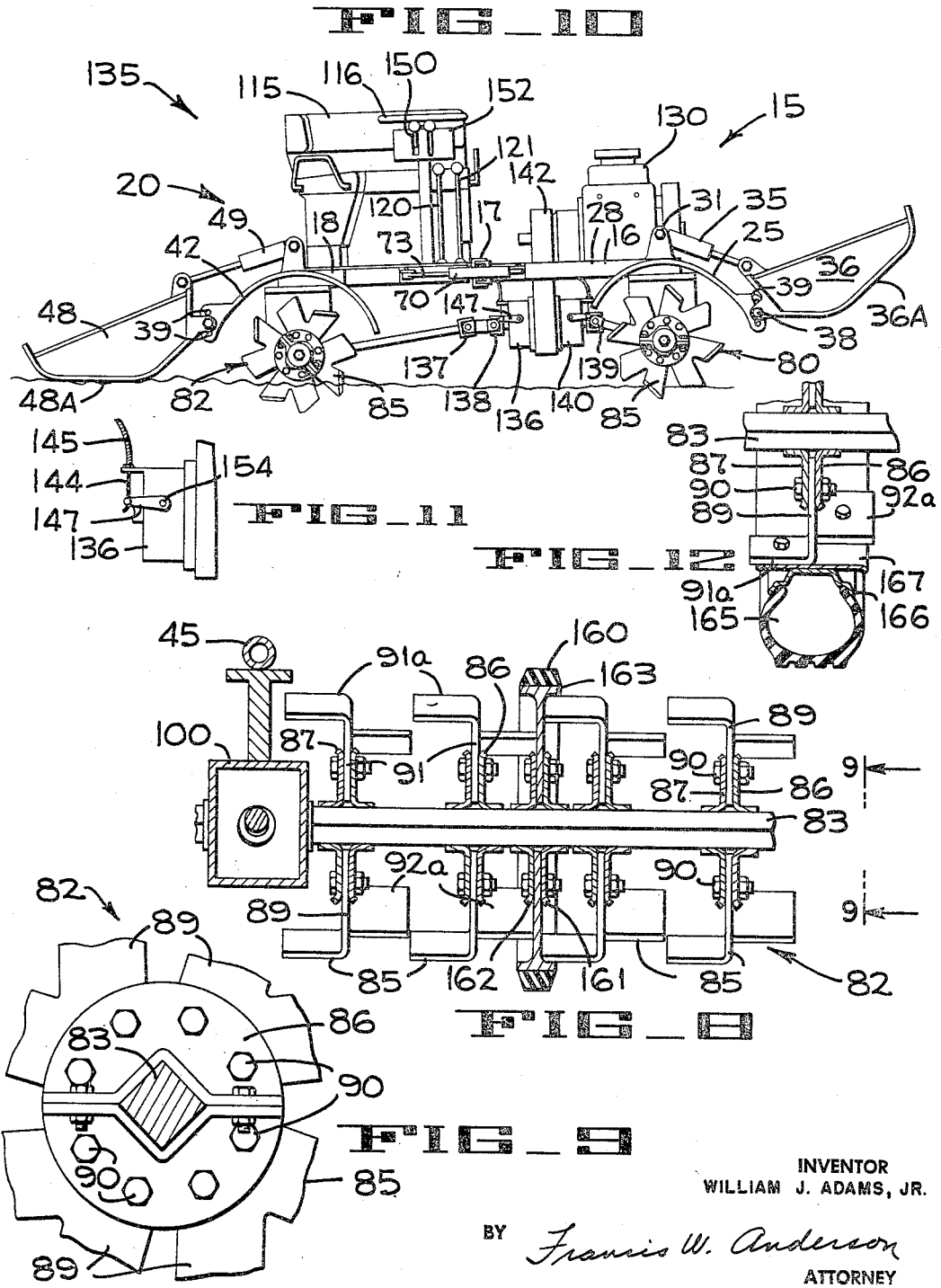

United States Patent Office 3,490,541
Patented Jan. 20, 1970

3,490,541
APPARATUS FOR PREPARING SOIL
William J. Adams, Jr., San Jose, Calif., assignor to FMC Corporation, San Jose, Calif., a corporation of Delaware
Filed July 1, 1966, Ser. No. 562,154
Int. Cl. A01b 33/02, 33/08, 35/28
U.S. Cl. 172—116                                    8 Claims

ABSTRACT OF THE DISCLOSURE

A ground working vehicle has two rotor assemblies mounted in ground engaging positions at opposite ends of a support frame. The vehicle can be driven in the direction of either end of the support frame and one rotor assembly will provide support and propelling action while the other rotor assembly provides cutting and soil displacing action.

This invention relates to ground working apparatus and, more particularly, it concerns an improved propulsion and soil-working mechanism for a tiller.

In certain areas of the world crops are produced most effectively if wet-land farming techniques are used. One step in this type of farming involves cultivating or tilling the soil while the area is partially or entirely under water. Conventional tillers have not been completely satisfactory for this service since it is difficult to maintain driving engagement with the soil which, in many cases, is actually a slurry of mud. Also, in many areas the plots being cultivated are small and as much as 40% of the worker's time is used up in turning and maneuvering conventional tillers.

An object of the present invention is to provide an improved propulsion mechanism for a tiller that is particularly adapted for use where the soil is relatively soft and yielding.

Another object is to provide a tiller that can be operated in tilling engagement with the soil while moving forwardly or rearwardly.

Another object is to provide an efficient rotor assembly for a tiller which can be used alternately as a propulsion device or as a ground-working instrument.

A further object is to provide an improved depth control member for a tiller.

Another object is to provide a relatively lightweight, economical reversible tiller.

Another object is to provide an improved chassis arrangement for a tiller and an efficient steering mechanism for a tiller having the improved chassis.

Other and further features, objects, and advantages will be apparent from the following description, taken in connection with the accompanying drawings, in which:

FIGURE 1 is a schematic perspective of a tiller constructed in accordance with the present invention.

FIGURE 2 is a reduced schematic side elevation of the machine of FIGURE 1.

FIGURES 3 and 4 are enlarged diagrammatic views showing the operation, respectively, of a rotor assembly operating as a propulsion unit and a rotor assembly acting as a tilling unit.

FIGURE 4A is a fragmentary side elevation of a modified form of the rotor units on each rotor assembly.

FIGURE 5 is a more or less diagrammatic horizontal section taken along line 5—5 of FIGURE 2.

FIGURE 6 is an enlarged vertical section taken along line 6—6 of FIGURE 5.

FIGURE 7 is a horizontal section taken along line 7—7 of FIGURE 2.

FIGURE 8 is an enlarged fragmentary vertical section taken along line 8—8 of FIGURE 2.

FIGURE 9 is an end elevation taken looking in the direction of arrows 9—9 of FIGURE 8.

FIGURE 10 is a schematic side elevation of a second embodiment of the invention of the persent invention.

FIGURE 11 is an enlarged view of a portion of FIGURE 10.

FIGURE 12 is a fragmentary front elevation of a portion of a rotor assembly having a second embodiment of the accessory wheel of the present invention.

The embodiment of the tiller of the present invention that is illustrated in FIGURES 1, 2 and 5 comprises a forward unit 15 having a chassis 16 that is pivoted by means of a pivot joint 17 to a chassis 18 of a rear unit 20. The forward unit 15 includes a rigid hood 25 that is generally semi-cylindrical in configuration and is secured to three rigid tubes 26, 27 and 28 of chassis 16 which are welded together to form a rigid structure, the center tube 27 having a U-shaped member 29 (FIG. 6) at one end forming part of the pivot joint 17. Two rigid spaced upstanding tabs 30 and 31 (FIG. 5) are welded to and project upwardly from the hood 25 at each side of the center tube 27 to receive a pin 33 that pivotally mounts the end of a double-acting hydraulic power cylinder 35. The other end of the cylinder 35 is pivoted to a depth control and leveling shoe 36 which projects forwardly from the chassis 16 and is pivoted to the hood 25 by a pivot joint 38 (FIG. 1) adjacent one side edge of the hood and by an identical joint (not shown) that is positioned at the opposite side edge of the hood in alignment with joint 38. A plurality of holes 39 may be provided in vertically spaced relation on the hood so that the height of each shoe can be adjusted to vary the depth of penetration of the tilling rotor. The shoe 36 has a flat planar surface 36A which, as will be explained presently, can be lowered to engage the surface being tilled to act as a depth control member or can be raised to the position of FIGURE 1 where it is spaced from said surface a sufficient distance to assure that it will not engage rises in the surface and encumber the forward movement of the vehicle.

The rear unit 20 is substantially identical in construction to the forward unit 15 but has its parts oriented differently. In general, the rear unit includes a generally semi-cylindrical hood 42 that is welded to three rigid interconnected tubes 44, 45 and 46 (FIG. 5). A shoe 48, which has a flat planar surface 48A, is pivoted at two points to the hood 42, and a double-acting hydraulic power cylinder 49 (FIG. 2) is connected between the shoe 48 and two rigid upstanding tabs 50 and 51 on the hood 42.

The central tube 45 of the rear unit has two antifriction bearing units 55 and 56 (FIG. 6) and a spacer sleeve 57 locked in its end by a threaded plug 58. A pivot shaft 60, that has a snap ring 61 at one end, extends freely through a hole in the plug 58 and is disposed in the bearing units and in the sleeve 57. The shaft 60 is integrally formed on a U-shaped member 63 which has aligned holes in its arms that are aligned with holes in the arms of the U-shaped member 29, the four aligned holes being arranged to receive a pivot pin 65 to complete the pivot joint 17.

The forward and rear units 15 and 20, respectively, are also interconnected by a double-acting hydraulic power cylinder 70 (FIG. 5) that is pivotally connected between rigid arms 71 and 72 that are welded to and project laterally from the center tubes 45 and 27, respectively. It will be evident that, when the piston rod 73 of the cylinder is retracted into the housing of cylinder 70 or projected out of the housing, the forward and rear units will pivot relative to each other. Accordingly, the vehicle is steered by actuating cylinder 70 to pivot one unit relative to the other.

Mounted under hood 25 (FIG. 2) is a rotor assembly 80 and mounted under hood 42 is a rotor assembly 82. The assemblies 80 and 82 (FIG. 7) are identical and each assembly includes a shaft 83 of square cross-section and a plurality of rotors 85 secured in spaced relation on the shaft. Each rotor comprises a pair of hub plates 86 and 87 (FIGS. 8 and 9) between which four blade units 89 are secured by bolts 90. As seen in FIGURES 9 and 10, each hub plate 86 and 87 is made in two pieces that are bolted together to secure the rotor on the shaft. Each blade unit 89 is a V-shaped member having two shanks 91 and 92 (FIG. 1) which are joined at the apex that receives the bolts 90. The shank 91 has a flat foot member 91a that projects outwardly from the shank at approximately right angles and is disposed in a plane that is parallel to the axis of shaft 83. The shank 92 has a flat foot member 92a that is also in a plane parallel to the axis of shaft 83 but projects away from the vertical plane of the shanks 91 and 92 in an opposite direction from the direction that foot 91a projects away from said vertical plane as seen in FIGURE 8.

In FIGURE 4A a second embodiment of the blade unit 94 is illustrated. In this form each blade is an individual member having a shank bolted between the hub plates 86 and 87 and a flat foot 95 with a sharpened edge 96.

The shaft 83 of each tiller assembly is journalled in a support housing 100 (FIG. 2) that is bolted to and projects downwardly from the associated chassis. As seen in FIGURE 7, the shaft is driven, through a bevel gear arrangement 101 and a universal joint 102, from the output shaft 103 of a hydraulic motor 105 which may be of the axial piston type that is supplied with pressurized fluid from an axial-piston pump 106. The pump may be of the swashplate type wherein its output is varied by varying the inclination of the swashplate. A control lever 110 is provided for each pump, and it is arranged to control the output of the pump by any suitable servo-motor such as a separate hydraulic system that is connected to the swashplate to vary its inclination. Each lever has at least five settings; stop or neutral, high speed forward, low speed forward, high speed reverse and low speed reverse. As will be explained presently, when the machine is moving forwardly during a tilling operation the preferable arrangement is for the forward rotor to operate at low speed while the rear rotor operates at high speed. During the forward movement, the forward rotor is acting as the propulsion unit and its action is schematically shown in FIGURE 3 wherein it will be seen that each flat foot 91a or 92a successively engages the surface, as at X, with maximum load carrying capacity and develops a push on the surface as it continues its clockwise rotation. It leaves the soil, as at Y, with minimum disturbance. The low speed setting of the rotor should be such that the vehicle moves forward at a ground speed of from 1 to 3 miles per hour. As the vehicle moves forward, the rear rotor acts as a tiller as shown schematically in FIGURE 4, wherein the increment of cut is indicated by the area A. The high speed setting of the rear rotor should be such that the peripheral speed of the rotors is approximately 400 feet per minute.

When the vehicle is traveling rearwardly, the rotors will rotate counterclockwise (FIG. 2) and the rear rotor will be driven at low speed and act as the propulsion member, while the forward rotor will be driven at high speed to till the soil.

The operator may sit on a seat 115 (FIG. 1) and actuate a steering wheel 116 that has a shaft extending into a control box 117 which is supported on a post 118. The portion of the shaft inside the box 117 actuates a valve mechanism that directs fluid under pressure to either end of the power cylinder 70 which controls the steering movements of the vehicle.

A pair of control levers 120 and 121 are mounted on the floor plate of the rear unit 20. Each lever extends through the plate and controls the operation of a conventional valve unit (not shown) that directs fluid selectively to either end of the power cylinders 35 and 49 (FIG. 2) of the depth control shoes 36 and 48, respectively.

Thus, by actuating the levers 110 the direction of rotation and the speed of the rotors can be set. By manipulating the levers 120 and 121 the positions of the depth control shoes 36 and 48 can be set. When these settings have been made the operator may steer the vehicle by use of the steering wheel.

A gasoline engine 130 is provided to supply power to the pumps 106 and to the other pumps (not shown) of the various hydraulic systems of the machine.

In FIGURES 10 and 11 is shown a second embodiment 135 of the machine of the present invention. This machine is identical to the machine of FIGURES 1 and 2 except that the drive mechanism is different. The parts of the machines that are identical are indicated by identical reference numerals. In the machine of FIGURE 10, the rear rotor 82 is driven from a transmission 136 through two universal joints 137 and 138, and the forward rotor 80 is driven through a universal joint 139 from a transmission 140. Both of the transmissions are driven by a chain drive (not shown) that is disposed in a transfer case 142 and is connected to the drive shaft of the engine 130. The speed of the output shaft of each transmission is varied by a flexible cable 144 (FIG. 11) that is contained in a sheath 145 and is connected between a control lever 147 (FIG. 11) of the transmission and a lever 150 that is mounted on a control box 152 immediately below the steering wheel 116. Each lever 150 is provided with five settings so that each control lever 147 of the transmission can be swung in an arcuate path about pivot point 154 to give positions corresponding to a stop or neutral position, high speed forward, low speed forward, high speed reverse, and low speed reverse.

A particular feature of the present invention is shown in FIGURE 8 wherein it will be noted that the rotor assembly 82 is provided with an accessory rotor 160 which is mounted between certain of the tined rotors. This rotor is made up of two split hub plates 161 and 162, which are identical to the hub plates 86 and 87 and are secured to the shaft in the same manner. A disc wheel 163, which is bolted between the plates 161 and 162, has a solid rubber tread provided on its periphery. It will be understood that two of these accessory rotors 160 may be incorporated in each of the rotor assemblies 80 and 82, which one rotor 160 on each side of the longitudinal centerline of the vehicle.

It will be evident that, when the vehicle is operating in the wet soil, the tires will not interfere with the tilling operation and, when the vehicle is moved onto a paved road, the tires will raise the flat foot members 91a and 92a out of engagement with the road.

To install the accessory rotor, the depth control shoe 36 or 48 at the adjacent end of the vehicle is swung downwardly by its power cylinder until it engages the ground and lifts the rotor assembly to a slightly elevated position. The rotors adjacent the end of the shaft are removed, the accessory rotor is clamped in place on the shaft, and the end rotors are reinstalled. When the accessory rotors are in place, the depth shoe is slowly raised to allow the rotor assembly to again engage the ground.

If desired, a pneumatic tire 165 (FIG. 12) on a metal rim 166 may be used as an accessory wheel. Such a wheel would have a cylindrical plate 167 secured to the inner periphery of the metal rim, as by welding, with the plate being slightly larger in internal diameter than the circle defined by the outer periphery of the adjacent flat foot members 91a and 92a so that the wheel can be moved axially over the shaft without removing any of the rotor units. The cylindrical plate is provided with holes that can be aligned with holes in the flat foot members to be bolted thereto.

While it is preferred that, when the machine is tilling, the leading rotor assembly be operated at low speed while the rear rotor operates at high speed, it is of course possible that any speed desired differentials between the front and rear rotor assemblies may be used. Thus, while the front rotor can be operated at a speed wherein it pulls the machine forward, it can also be operated at a speed such that it actually retards the forward speed.

It is within the scope of the present invention to form each depth control shoe in a manner such that it will shape the soil rearwardly of the tilling rotor to form seed beds or the like.

From the foregoing description it will be seen that the present invention provides an effective ground-working apparatus. The dual-purpose use of rotors alternately as propulsion members or as tilling members makes possible a relatively-lightweight, economical structure particularly adapted for use in fields where the soil is relatively yieldable. Further, the reversible drive mechanism in combination with the oppositely oriented rotors provides a tiller that eliminates the necessity of turning the tiller around when the edge of a field is reached, it being necessary only to put the present tiller in reverse and direct it along the desired rearward path. The flat foot-like members on the rotors provide an efficient instrument for efficiently engaging the soil in both ground-working and propulsion actions. The depth control shoes associated with each rotor assembly is a completely new mechanism for limiting the depth of cut of the associated rotors and for smoothing out the soil and shaping the beds. The rubber-tired accessory wheel in association with the rotors makes it possible for the operator to run the vehicle on paved roads as well as in the field to be tilled.

It will be understood that modifications and variations may be effected without departing from the scope of the present invention.

Having thus described my invention, what I claim as new and desire to protect by Letters Patent is:

1. A ground-working vehicle comprising a support frame, a rotor assembly mounted transversely of said frame at each end thereof, each rotor assembly having a plurality of bladed rotor units, and means for driving said rotor assemblies, the blades of the forward rotor assembly having foot members with generally flat surfaces for engaging the soil in face-to-face load-bearing engagement and the blades of the rear rotor assembly having sharpened edges defining the periphery of a circle around the axis of rotation of the rotor and arranged to engage the soil with a predetermined angle of attack for cutting into and displacing quantities of the soil, the flat surface of each blade being formed on a chord of said circle and passing through the periphery of the circle adjacent the associated cutting edge of the blade.

2. A vehicle according to claim 1 wherein said drive means includes means for varying the relative rotary speeds of said front and rear rotor assembly.

3. A vehicle according to claim 1 wherein said drive means includes means for driving said rotor assemblies alternately in a clockwise or in a counterclockwise direction, the flat surfaces and sharpened edges of each foot member of each rotor unit being so oriented relative to the axis of rotation of the associated rotor assembly that, when the rotor assemblies are driven in either a clockwise direction or a counterclockwise direction, the flat surfaces of the rotor assembly that is at the forward end of said frame relative to the direction of movement, engage the soil in load-bearing contact and the sharpened edges of the rotor assembly at the trailing end of said frame engage the soil in cutting and soil displacing contact.

4. A ground-working vehicle comprising a support frame, a rotor assembly mounted transversely of said frame adjacent each end thereof, each rotor assembly having a plurality of bladed rotor units, and means for driving said rotor assemblies in a predetermined direction, the blades of one rotor assembly having foot members with generally flat surfaces disposed in planes on chords of the circle defined by the periphery of said one rotor assembly to engage the soil in face-to-face load-bearing engagement when said one rotor assembly is rotated in said predetermined direction, and the blades of the other rotor assembly having sharpened edges on the periphery of said circle to engage the soil with a predetermined angle of attack for cutting into and displacing quantities of the soil when said other rotor is rotated in said predetermined direction.

5. A ground-working vehicle comprising a support frame, a rotor assembly mounted transversely of said frame adjacent each end thereof, each rotor assembly having a plurality of bladed rotor units, each blade having foot members with generally flat surfaces adapted to engage the soil in face-to-face load-bearing engagement when the rotor is rotated in one direction of rotation and having sharpened edges defining the periphery of circle about the axis of rotation of said rotor to engage the soil with a predetermined angle of attack for cutting into and displacing quantities of soil when the rotor is rotated in a direction opposite said one direction, the flat surface of each foot member being disposed in a chordal plane that passes close to the associated cutting edge and is intermediate the radial plane and the tangential plane passing through said edge, and means for rotating said rotor units in each of said directions.

6. A ground-working vehicle comprising a support frame, and a rotor assembly rotatably mounted transversely of said frame at each end thereof, each rotor assembly having means providing a plurality of sharpened edges defining the periphery of a circle around the axis of rotation of the rotor and arranged to engage the soil at a predetermined angle of attack for cutting into and displacing quantities of material as said rotor is moved in a first rotary direction, each rotor asembly also having means providing foot members with surfaces formed on chords of a circle disposed around the axis of rotation of said rotor and adapted to contact the soil in relatively flat load-bearing contact when said rotor is rotated in a direction opposite said first direction, and means for driving said rotors in either of said directions.

7. The vehicle of claim 6 wherein each rotor has a plurality of said sharpened edges and a plurality of said foot members disposed in the same vertical plane.

8. A ground-working vehicle comprising a support frame, and a rotor rotatably mounted transversely of said frame at each end thereof, each of said rotors having means providing a plurality of sharpened edges defining the periphery of a circle around the axis of said rotor and arranged to engage the soil at a predetermined angle of attack for cutting into and displacing quantities of soil when said rotor is rotated, and said rotor also having means providing foot members with surfaces formed on chords of a circle around the axis of said one rotor and adapted to contact the soil in relatively flat load-bearing contact when said rotor is rotated, the sharpened edges of one of said rotors being effective to cut into the soil when said one rotor is rotated in a first direction of rotation and the foot members of said one rotor being movable into load-bearing contact when said one rotor is rotated in a second direction, while the sharpened edges of the other rotor are effective to cut into the soil when said other rotor is rotated in said second direction and the foot members of said other rotor being movable into load-bearing contact when said other rotor is rotated in the first direction, and means for driving said rotors in said first or said second direction.

References Cited

UNITED STATES PATENTS

| | | | |
|---|---|---|---|
| 360,707 | 4/1887 | Lubin | 172—548 |
| 1,502,795 | 7/1924 | Parker | 172—536 X |
| 2,226,182 | 12/1940 | Ross | 172—116 X |
| 2,228,265 | 1/1941 | Garey | 172—243 |
| 2,228,389 | 1/1941 | Garey | 172—548 |
| 2,815,631 | 12/1957 | Northcote et al. | 72—78 X |
| 3,029,879 | 4/1962 | Wells | 172—112 X |

FOREIGN PATENTS

| | | |
|---|---|---|
| 197,989 | 5/1923 | Great Britain. |
| 1,060,641 | 7/1959 | Germany. |

ROBERT E. PULFREY, Primary Examiner

STEPHEN C. PELLEGRINO, Assistant Examiner

U.S. Cl. X.R.

172—48, 112, 536, 548